(12) United States Patent
Link et al.

(10) Patent No.: US 7,301,971 B2
(45) Date of Patent: Nov. 27, 2007

(54) METHOD AND APPARATUS FOR CONTINUOUS SYNCHRONIZATION OF A PLURALITY OF ASYNCHRONOUS DATA SOURCES

(75) Inventors: Bruce A. Link, Rochester, NY (US); Wai Hung Dye, Rochester, NY (US); James A. Oliver, Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 879 days.

(21) Appl. No.: 10/638,865

(22) Filed: Aug. 11, 2003

(65) Prior Publication Data

US 2005/0036518 A1    Feb. 17, 2005

(51) Int. Cl.
*H04J 3/22* (2006.01)

(52) U.S. Cl. .............. 370/538; 713/400; 382/284; 358/474; 358/486; 348/423.1; 348/425.4; 348/500; 348/512; 345/213

(58) Field of Classification Search ........ 370/503, 370/504, 507, 508, 391, 538; 713/400; 375/356–359; 715/500.1; 348/423.1, 425.4, 500, 512, 513; 382/284; 345/213; 358/474.486
See application file for complete search history.

(56) References Cited

U.S. PATENT DOCUMENTS

| | | | |
|---|---|---|---|
| 4,080,528 A | 3/1978 | Kao et al. | |
| 4,573,017 A | 2/1986 | Levine | |
| 5,689,347 A | 11/1997 | Naoi | |
| 5,781,544 A | 7/1998 | Daane | |
| 5,847,717 A * | 12/1998 | Berry | 345/506 |
| 5,918,040 A * | 6/1999 | Jarvis | 713/375 |
| 6,075,622 A | 6/2000 | Hadgis et al. | |
| 6,115,377 A * | 9/2000 | Lutz et al. | 370/391 |
| 6,487,140 B2 * | 11/2002 | Tomaiuolo et al. | 365/233 |
| 6,738,917 B2 * | 5/2004 | Hummel et al. | 713/400 |
| 7,100,065 B2 * | 8/2006 | Adkisson | 713/400 |
| 2001/0033524 A1 * | 10/2001 | Tomaiuolo et al. | 365/233 |
| 2002/0007465 A1 * | 1/2002 | Dive | 713/400 |
| 2002/0018145 A1 * | 2/2002 | Howald et al. | 348/538 |
| 2003/0115594 A1 * | 6/2003 | Koo et al. | 725/31 |
| 2004/0062278 A1 * | 4/2004 | Hadzic et al. | 370/503 |
| 2004/0193931 A1 * | 9/2004 | Akkerman et al. | 713/400 |
| 2004/0225910 A1 * | 11/2004 | Adkisson | 713/400 |

* cited by examiner

*Primary Examiner*—Doris H. To
*Assistant Examiner*—Habte Mered
(74) *Attorney, Agent, or Firm*—Nelson Adrian Blish (57) ABSTRACT

An apparatus and method for continuous synchronization of a pair of independently clocked asynchronous data streams (100, 101) consisting of raster data from independent imaging acquisition systems comprises a means for acquiring individual rasters from a first stream of data. A counter for counting (60) a first total number of received rasters and data merge logic (65) for comparing the first total to a first threshold. A means for acquiring individual rasters from a second stream of data. A means for transferring the first acquired data stream and the second acquired data stream to a composite output when the first total is greater than the first threshold. The method includes adding or subtracting idle pixels from an interline gap.

13 Claims, 6 Drawing Sheets

METHOD AND APPARATUS FOR CONTINUOUS SYNCHRONIZATION OF A PLURALITY OF ASYNCHRONOUS DATA SOURCES

FIELD OF THE INVENTION

The present invention relates in general to continuous synchronization of a plurality of independently clocked asynchronous data sources and in particular, to merging scanner data streams.

BACKGROUND OF THE INVENTION

In duplex document scanning applications, it is desirable to merge both front and rear document image acquisition system outputs into a single composite image. It is further desirable to merge the outputs of two image acquisition systems, which are asynchronous to one another. Generally speaking, the image data from the two asynchronous data streams could be interleaved in one of three possible ways, 1) pixel interleaving where each pixel could be n-bits wide, 2) raster interleaving where a raster is comprised of several n-bit bytes, and 3) document interleaving where a document is comprised of several rasters.

Merging data from multiple sources can be accomplished in a variety of ways. The first method requires that the data streams be synchronous to one another. For example, one method might implement a master clock on one image acquisition system while the other image acquisition system is synchronized to the master via a phase locking mechanism. From a manufacturing perspective, this requires that two different parts be stocked; a master and a slave. Furthermore, group delays associated with transmitting the master clock between systems would cause a skew between the data and clock of the slave system. This is especially true, and a potential limitation, at high data rates or while transmitting data over long distances.

Another scheme for merging data from multiple sources is to have a master clock at the receiver. This master clock is then transmitted to the image acquisition systems. Once again, this scheme presents a problem with group delays which would cause skew between the data and the clock, possibly limiting data rates and transmission distances. Furthermore, the clock frequency of the image acquisition systems in this scenario is dictated by the data receiver making the system less flexible.

The method described in U.S. Pat. No. 6,115,377 describes a method wherein the image acquisition systems are allowed to be asynchronous and the receiver merges the data by buffering the data. A problem with this method results from the fact it uses the document length for calculating the image frame size, which is used to calculate the total additional memory requirements (TAMR). This limits the document length to the amount of memory available. Furthermore, it uses the image acquisition system (IAS) offset and therefore places restrictions on the offset between the two streams to be merged. This method requires a moment in time where both data streams are idle or contain invalid data to prevent the buffers from overflowing.

It is desirable to allow each image acquisition system, or any other data source, to select a data rate that is appropriate for the application. It is also desirable to allow each system to supply its own clock, completely asynchronous to one another. Finally, it is desirable to synchronize and merge the data from the sources without concern for the length of the data stream or location of valid data.

SUMMARY OF THE INVENTION

Briefly, according to one aspect of the present invention a method for continuous synchronization of a plurality of independently clocked asynchronous data sources comprises the steps of:
- a) acquiring data units from a plurality of m data sources;
- b) designating one of the data sources as a master data source;
- c) designating all other data sources except the master data source as slave data sources;
- d) set n=1 wherein n is one of the slave data source;
  - d1) set p=1 wherein p is a secondary valid line for the slave data sources;
- e) compare a secondary valid line p for n slave data source to a reference valid line p for the master data source;
  - e1) if the n secondary valid line p is synchronized to within a predetermined threshold of the reference valid line p go to step f);
  - e2) if the n secondary valid line p lags the reference valid line p subtract at least one idle pixel from an interline gap in the secondary valid line and go to step e4);
  - e3) if the n secondary valid line p leads the reference valid line p add at least one idle pixel to an interline gap in the secondary valid line and go to step e4);
  - e4) set p=p+1 and go to step e);
- f) compare n to m;
  - f1) if n is less than m, set n=n+1, go to step e);
  - f2) if n is equals m−1, go to step g); and
- g) assert a lock signal.

The invention and its objects and advantages will become more apparent in the detailed description of the preferred embodiment presented below.

DETAILED DESCRIPTION OF THE INVENTION

The present invention will be directed in particular to elements forming part of, or in cooperation more directly with the apparatus in accordance with the present invention. It is to be understood that elements not specifically shown or described may take various forms well known to those skilled in the art.

Figure 1:
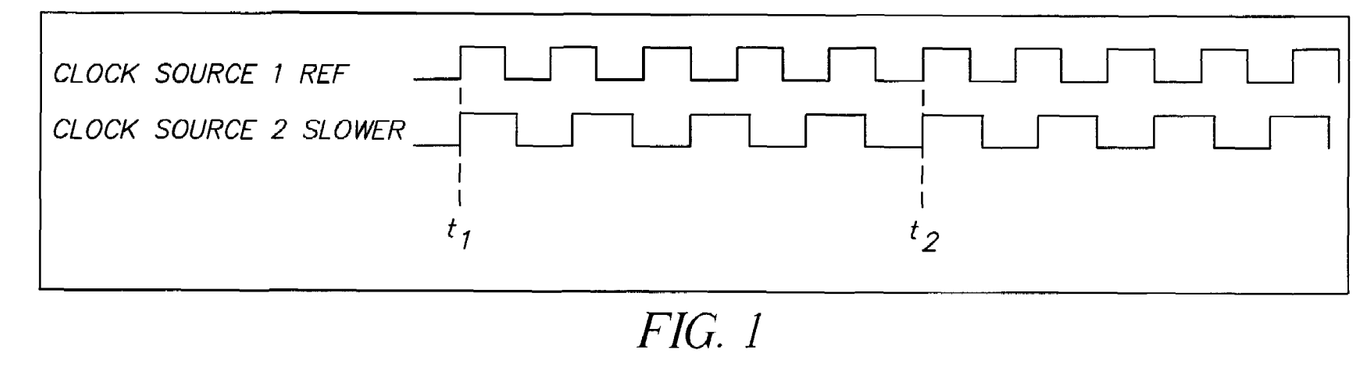
FIG. 1 shows a timing diagram of a system wherein clock source two is slower than the reference clock source.
Figure 2:
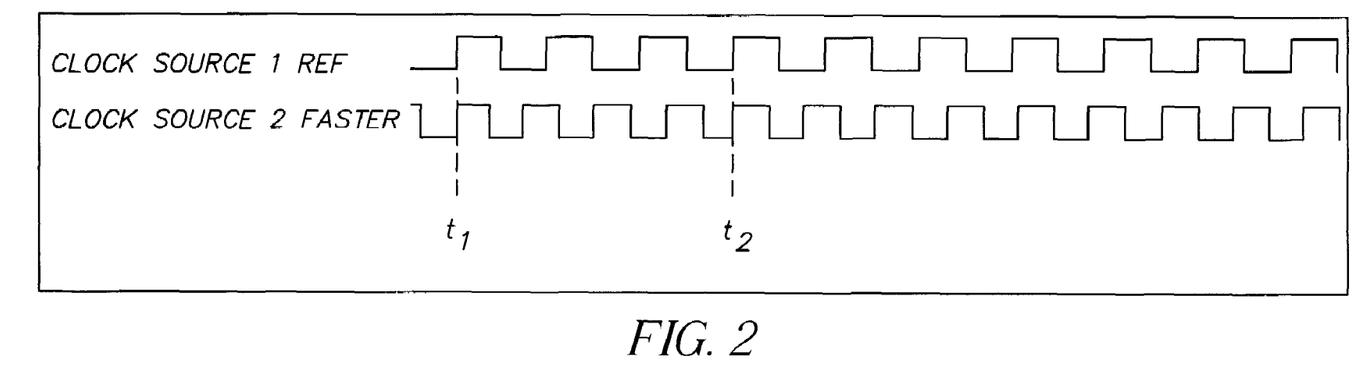
FIG. 2 shows a timing diagram of a system wherein clock source two is faster than the reference clock source.

When two independent clocks are present in a system, there will always be an unknown phase relationship between the two clock sources. Worse yet, no matter what the clock sources are, there will also be a frequency difference. This frequency difference will cause the clocks to move in both time and phase relationship to each other. There are two cases to consider when analyzing this scenario as shown in FIG. 1 where Clock Source 2 is slower than Clock Source 1. The other scenario is illustrated in FIG. 2 where Clock Source 2 is faster than Clock Source 1. For discussion purposes, Clock Source 1 will be used as the reference clock source.

Although the frequency difference is overly exaggerated in FIGS. 1 and 2, it can be seen from the initial coincident rising edge ($t_1$) until the next coincident rising edge ($t_2$) that there is a difference in the number of cycles that each clock goes through. The problem arises when a third system receives this data and is required to maintain a certain relationship between the data being received from both clock sources. In Case I, the data stream associated with Clock Source 2 is falling behind the data stream associated with Clock Source 1. In Case II the opposite condition occurs. Thus, in any given time window there will always be a mismatch between the number of data elements received and the number of data pairs which can be created. This implies that the slower clock source dominates the rate at which data pairs can be created and requires the data interleaving system to have memory to store the excess data coming from the faster data stream.

Under continuous data interleaving operation, the interleaving system would have to have an infinite memory depth because it must continuously store the faster systems excess data. However, if a finite limit can be imposed on the size of the data expected, then the interleaving system only requires a memory which is deep enough to hold the excess data which accumulates over the data stream's transmission time. Upon completing the transmission of the frame data from both asynchronous input data streams, some idle time is required to transmit the excess data from the faster data stream. The idle time between data stream transmissions must be long enough for the interleaving system to empty the memory where the excess data has accumulated. Only when the following two conditions are met can a system be developed to handle the interleaving of two or more asynchronous data streams; finite amount of data; and sufficient idle time between data stream transmissions.

One application of this method is described below where image data from two asynchronous image acquisition systems of a duplex scanner are to be merged. For the remainder of this disclosure, the preferred embodiment will be limited to a duplex scanner where the front and rear side images of a document are to be merged using the raster interleaving technique. The reader is reminded that pixel interleaving and document interleaving are also possible. Both of which are extensions of raster interleaving.

Image Data, A Special Case

Figure 3:
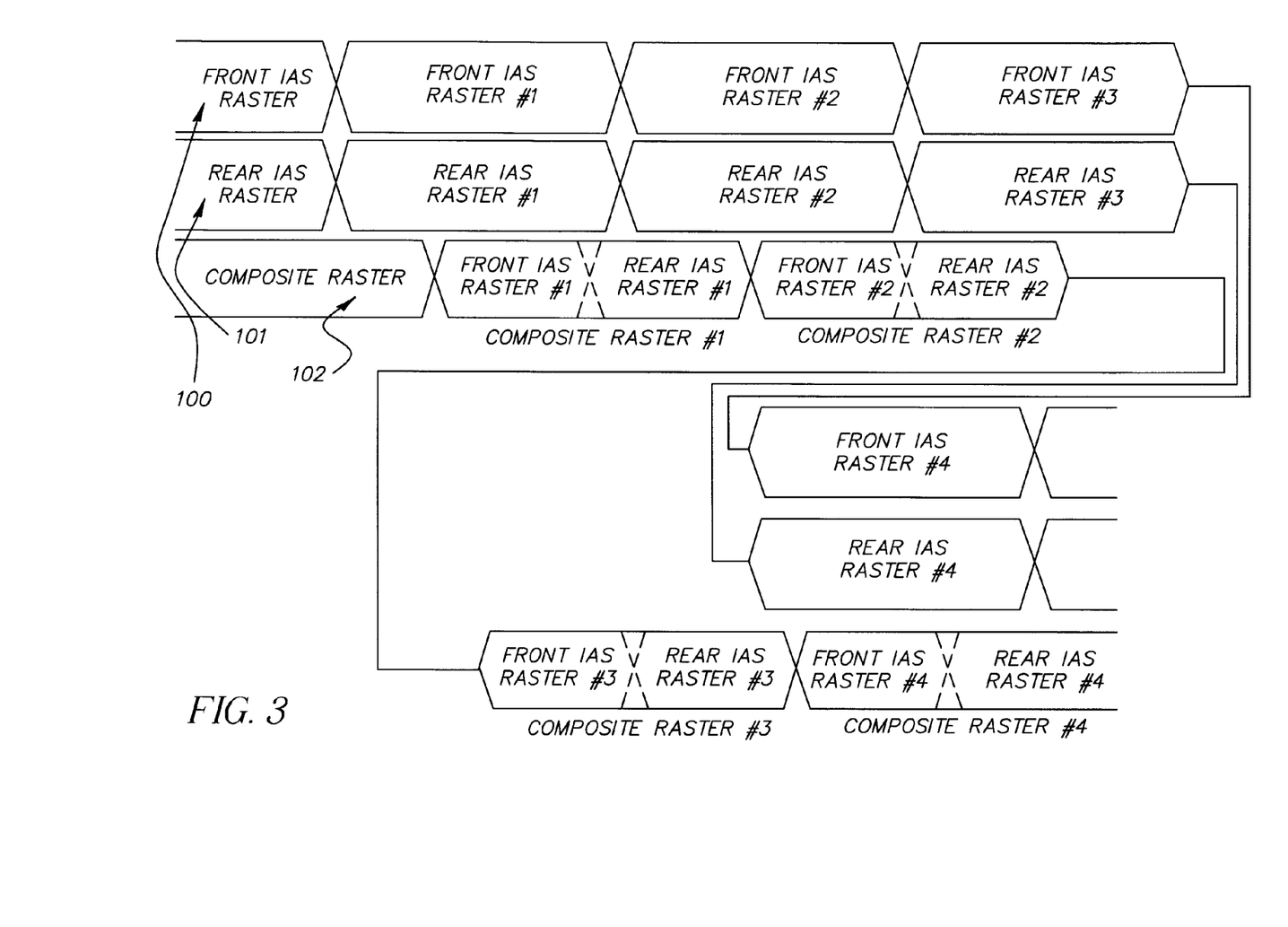
FIG. 3 illustrates the relationship between the input data from two asynchronous data sources and the resultant output data stream of interleaved data.

The preferred embodiment will implement a raster interleaving technique (more generally, record interleaving). In this case, image data is received in packets called rasters from the image acquisition systems (IAS) at 17 MHz. This data is synchronized as discussed later in the text using input FIFOs and sequenced into a composite raster 102 comprised of both front IAS raster 100 and rear IAS raster 101 interleaved as illustrated in FIG. 3. The raster data is output at least twice the input data rate, or 40 MHz, in this particular instance.

Figure 4:
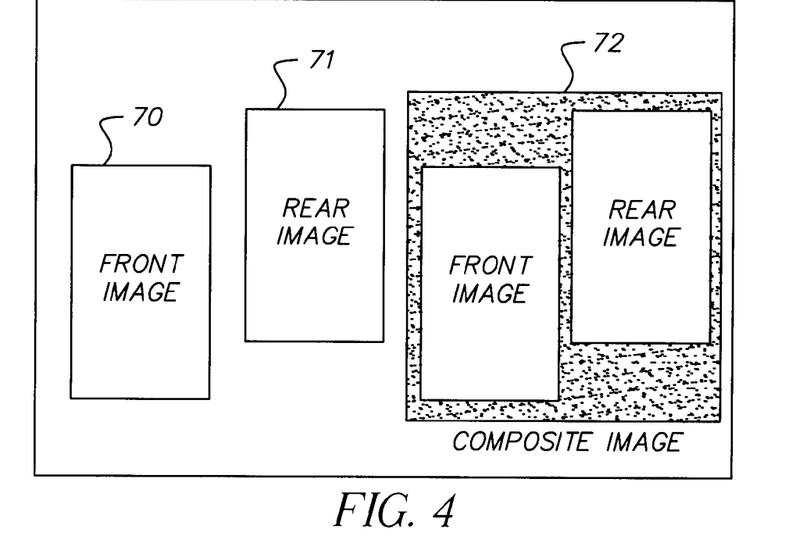
FIG. 4 illustrates a composite image, which results when two images are merged and there exist a composite raster wherein there is no valid image data.

The simple case composite image 72 is illustrated in FIG. 4. The front and rear images of a document are independently received from two asynchronous image acquisition systems. Once each raster of the front image 70 has been paired with its corresponding raster from the rear image 71, a composite image 72 is created. This single image can then be processed by a single image processor. To avoid initial condition anomalies around the perimeter of each image, a black border is added. Note that the front and rear images 70 and 71 of a document overlap each other such that there exist a composite raster 102 that does not contain any valid image data.

Figure 5:
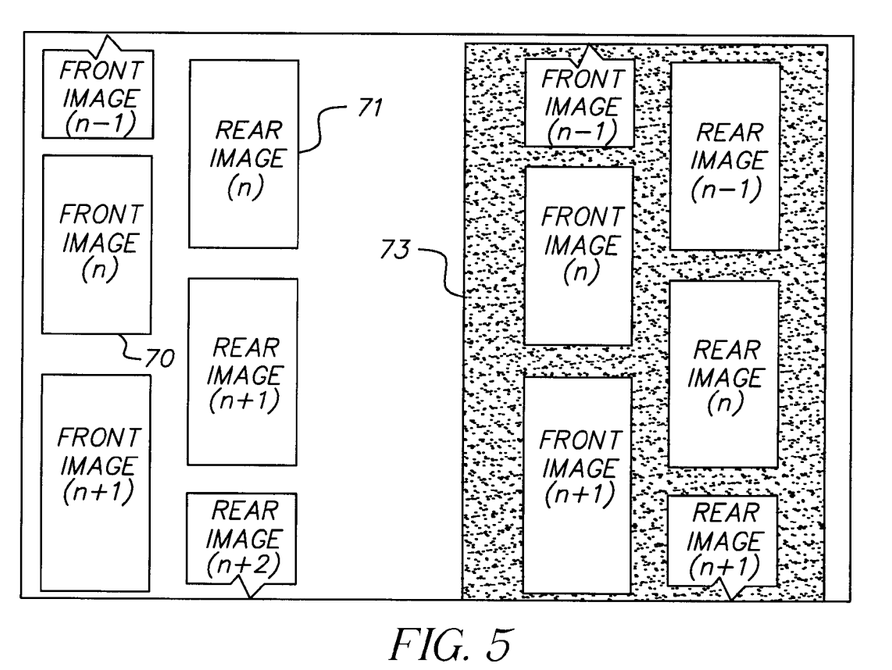
FIG. 5 illustrates a composite image, which results when two images are merged and all composite rasters contain valid image data.

The complex composite image 73 is illustrated in FIG. 5. In this case, the inter-document gap is so small and/or IAS offset is so large that the front and rear image 70 and 71 may overlap multiple documents. The front and rear images 70 and 71 of a document are independently received from two asynchronous image acquisition systems and overlap each other such that there is always valid image data in each composite raster. This means that once the complex composite image 73 is started, it can not be stopped without losing data.

This complex composite image 73 causes the method that is described in U.S. Pat. No. 6,115,377 to fail. The first-in-first-out (FIFOs) would be required to continuously capture image data, which would cause them to overflow. The FIFOs could be reset before the FIFO overflows but this would result in the loss of image data. Both options are unacceptable.

Again, it is also possible to perform pixel interleaving, document interleaving as well, or more generally n-bit byte interleaving or file interleaving. Pixel interleaving is impractical for this application since image data is typically arranged in rasters (or records). Similarly, document interleaving is impractical because each rear side of a document image would have to be completely buffered while the front side image is processed; this can be quite costly. Both these approaches may not make sense for image data management but may be similarly applied to other data systems.

Figure 6:
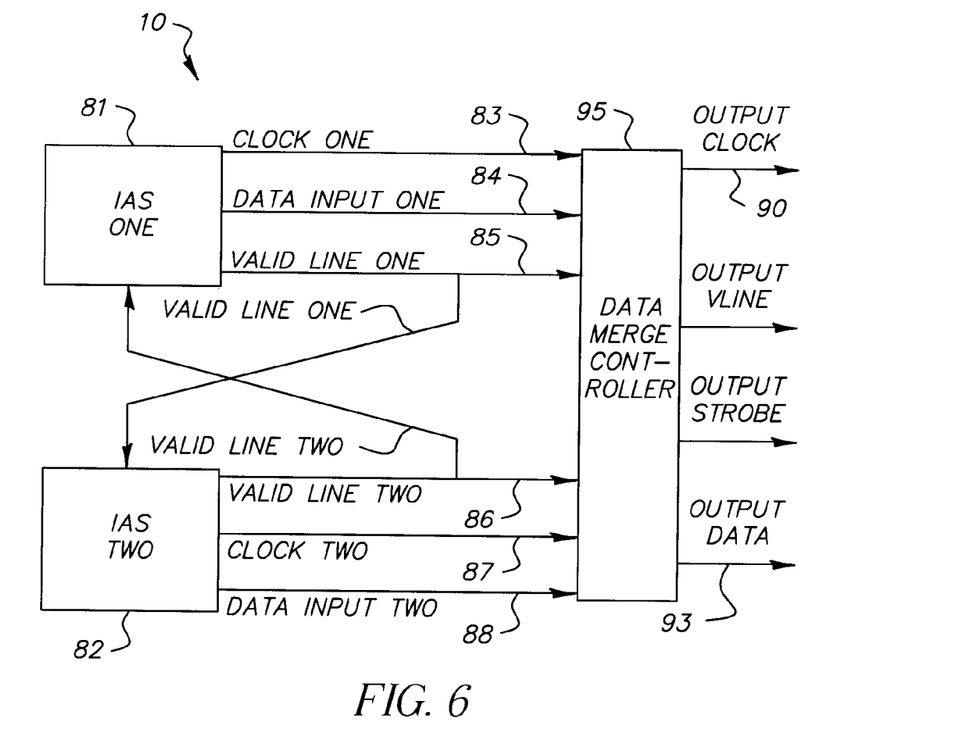
FIG. 6 illustrates a high-level block diagram of a system for interleaving data from asynchronous sources.

Referring now to FIGS. 6-9 the image merge operation of the preferred embodiment is performed by using input FIFOs to store raster data 84 and 88 from both the front image acquisition systems 81 and rear image acquisition systems 82. The basic functional block diagram of the image synchronization system 10 is shown in FIG. 6. The preferred embodiment describes a system, which is capable of acquiring image raster data 84 and 88 from two image acquisition systems 81 and 82, each independently clocked by input clocks 83 and 87. In preferred embodiment, the data rate is 17 Mbytes/sec but in practice, other data rates are also possible depending upon the product needs.

Data is written into the front and rear FIFOs synchronized to the IAS clocks 83 and 87, and read out synchronized to the merge controller clock 90 by the data merge controller 95. However because the two FIFO write clocks are asynchronous to each other, a phase skew and difference frequency exists between the front and rear FIFO fill rates. This makes the merge logic very complex but also requires the input FIFOs to have additional memory storage to handle the data requirements imposed by the effects of the phase skew and difference frequency ($f_{diff}$) described in the previous section.

Figure 7:
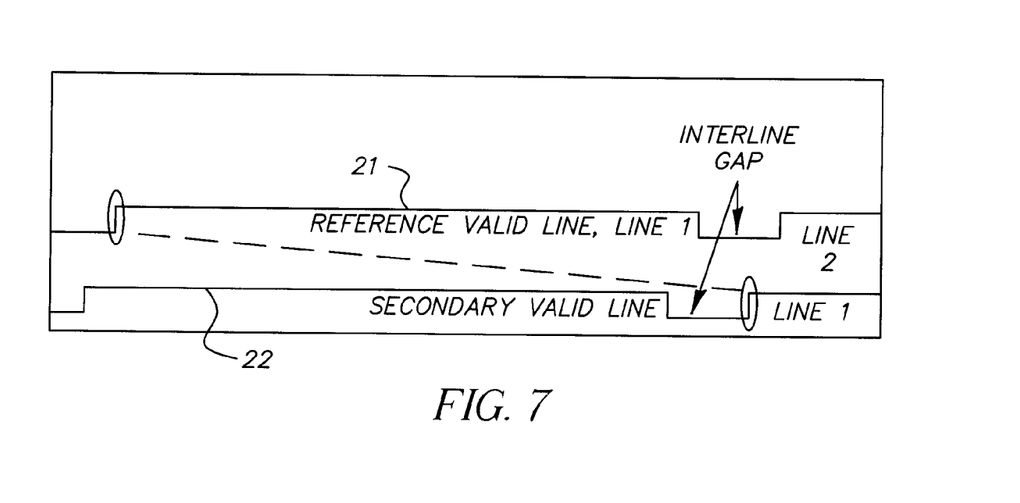
FIG. 7 illustrates the matching rising edges on valid lines of the reference and secondary systems, wherein the rising edges of the secondary system lags the rising edge first system.

The clock phase skew translates into a valid line phase skew as shown in FIG. 7 which imposes reserving one raster of storage in the input FIFOs to handle this case. In a data merge operation, one IAS's valid line 85 or 86 must be selected as the reference valid line 21. The reference valid line 21 will be used to start the merge operation but, as shown in FIG. 7, the secondary valid line 22 may be nearly an entire raster time out of phase with the reference valid line 21. In this case, the reference input FIFO must store one entire raster of input data while the merge logic controller waits for the secondary input FIFO to fill up with its' first valid line of data. Which valid line, front or rear, is selected as the reference has no affect on the additional FIFO memory requirement imposed by the valid line skew. However, the valid line selected as the reference does determine which half of the merged data the front and rear images appear in.

Figure 8:
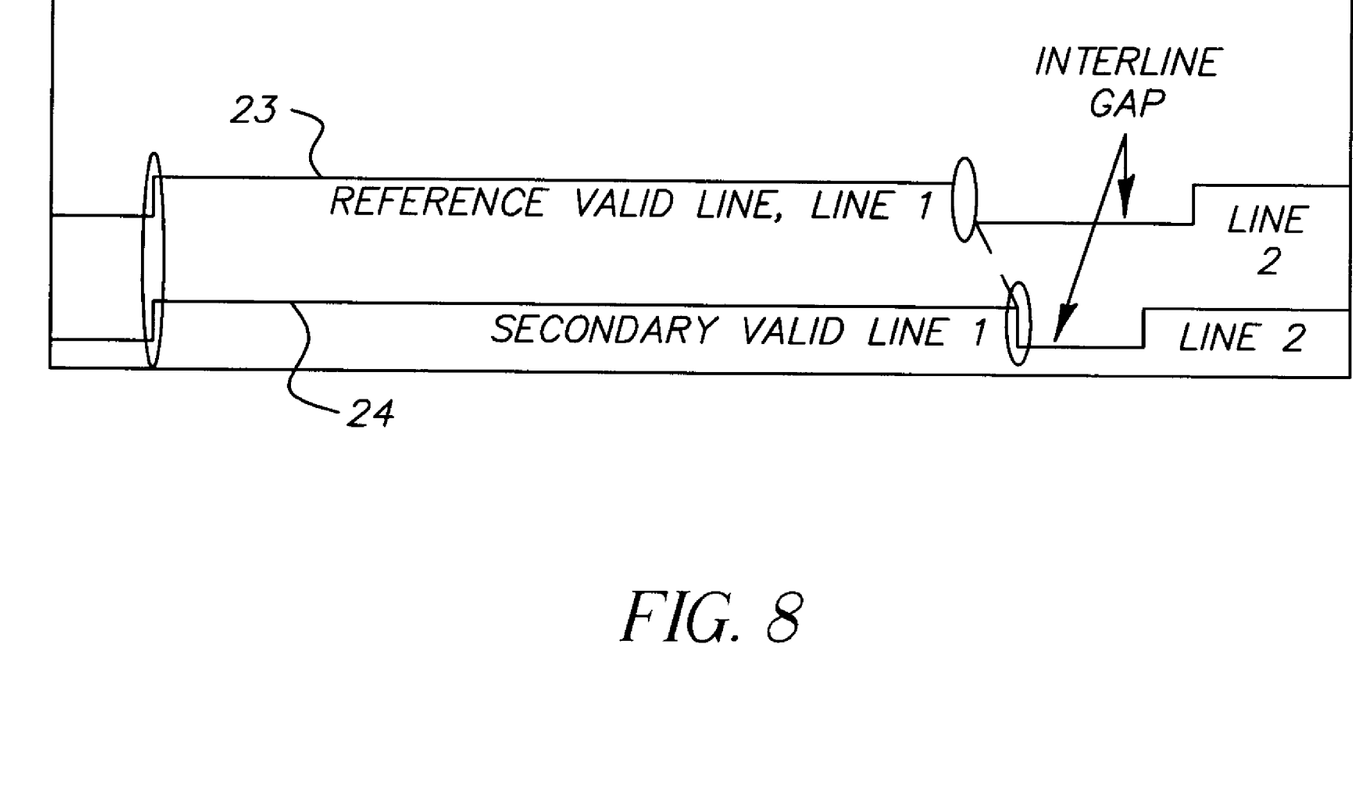
FIG. 8 illustrates matching rising edges on valid lines of the reference and secondary systems, where the rising edges are aligned.

However, if one were to align the start of the valid lines 23 and 24, the mis-alignment due to the phase skew and difference frequency would be pushed towards the end of the valid line as shown in FIG. 8. This would remove requirement of reserving one raster of storage in the input FIFOs to handle the valid line phase skew as shown in FIG. 7.

Since the IAS's valid lines 23 and 24 are asserted at the same time, the data merge controller 95 could start reading from the reference FIFO as soon as the data is written into the FIFO. Depending on the read clock frequency and when the merge controller starts reading from the FIFO it is possible to have the merge controller finish reading from the reference FIFO immediately after the last piece of data is written.

The IAS's valid lines 85 and 86 do not need to be asserted exactly at the same time. The amount of skew that could be tolerated depends on a number of factors, such as, but not limited to, interline gap, IAS frequencies and read rate.

The data merge controller 95 receives the asynchronous input data from each source, and, according to the present invention, interleaves said data into a single composite output stream 93. For maximum flexibility, according to the present invention, output clock 90 may operate independently of any of the other clocks in the system, with the only limitation being that the rate of the output clock must satisfy the following condition:

Clock out>(clock one+clock two)

Figure 9:
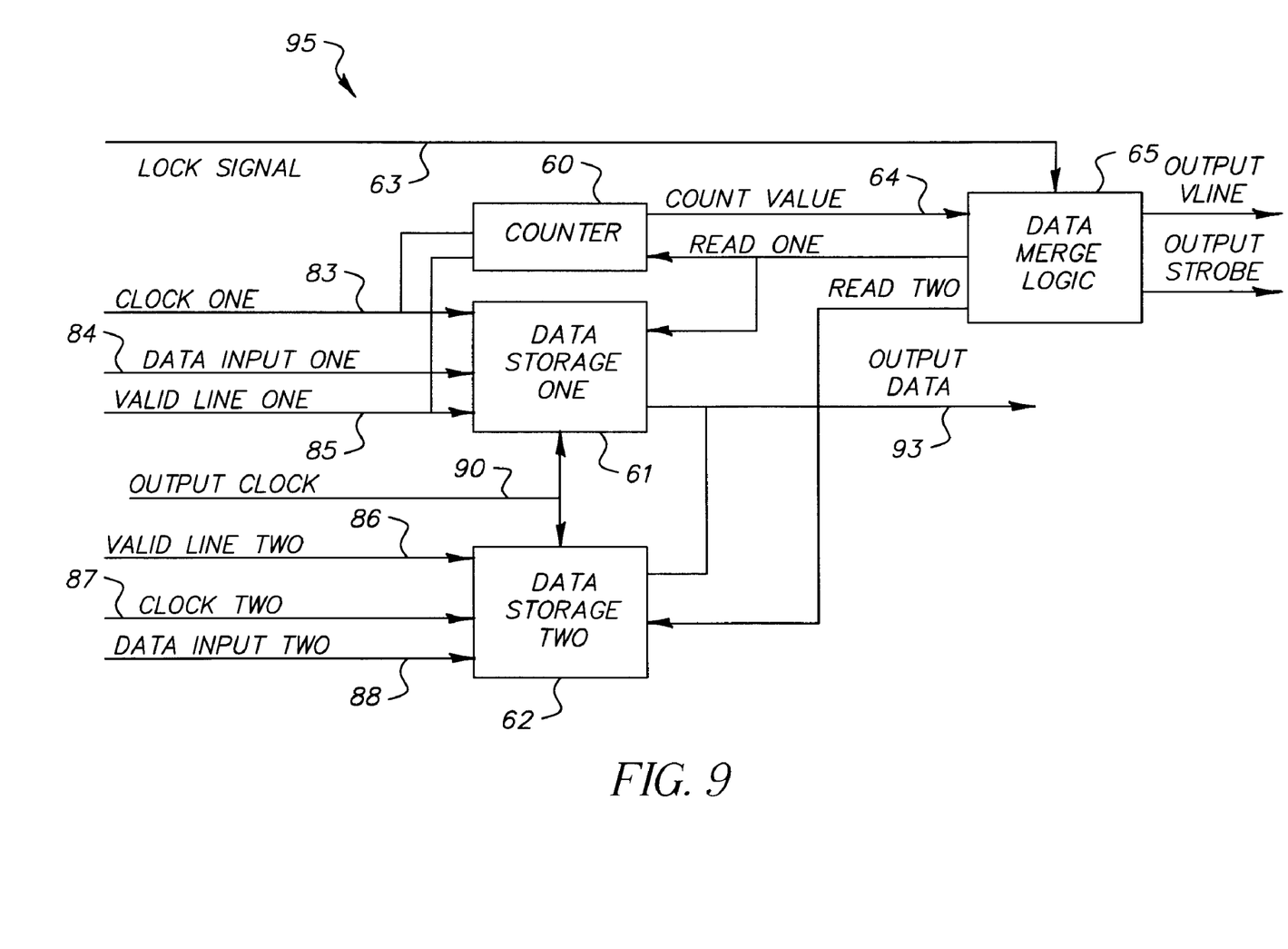
FIG. 9 illustrates a high-level block diagram of the data merge controller.

As shown in FIG. 9, data merge controller 95 is composed of two data storage unit 61 and 62, a counter 60 and the merge logic 65. The data units arrive at data storage unit one 61 at a rate of clock one 83 and at data storage two 62 at a rate of clock two 87. The counter 60 increments once for each clock pulse of clock one 83 while valid line one 85 is active and decrements once for each clock pulse of output clock 90 in which data is read from data storage unit 61. The choice between counting the data from IAS one 81 or IAS two 82 does not matter since valid line one 85 and valid line two 86 would be aligned and the data would be arriving at the two data storage unit 61 and 62 at about the same time. The data storage units 61 and 62 stores the data in a first-in-first-out (FIFO) manner. The output clock 90 clocks the data out of the FIFO to create the composite output stream 93. The merge logic 65 compares the count value 64 to a predetermine threshold to determine when to start merging data. The data merge logic 65 also monitors the lock signal 63, which indicates when the valid line one 85 and valid line two 86 are aligned.

In the preferred embodiment, the IAS nominal frequency is 17 MHz and the merge controller's output clock 90 is at least 2× the IAS clock. The data merge controller 95 starts reading when the reference FIFO is half full. This causes the reference FIFO to be emptied at the end of the reference valid line. The secondary FIFO is started immediately after the reference FIFO is empty. As long as the secondary FIFO is empty before it is time to start reading from the reference FIFO no additional memory is required. In the preferred embodiment, the reference FIFO needs to hold at least a half a raster and the secondary FIFO only needs to hold one raster worth of data. Since the relation between IAS is controlled, the maximum amount of data that can accumulate in the FIFOs is predictable and there is no need to have an event counter to track valid line one 85 and valid line two 86 as was done in U.S. Pat. No. 6,115,377.

Besides the phase skew, there is also data accumulating over an image frame time as a consequence of the difference frequency that exists between the two asynchronous clock sources. The difference frequency exists because any two-clock sources, no matter how ideal, will always have some variance between them unless one is phase locked to the other. To find the additional memory requirements imposed by the difference frequency, a detailed analysis of the difference frequency must be done.

The maximum difference frequency that exists between the front image acquisition systems clock 83 and rear and image acquisition systems clock 87 occurs when one oscillator is at its maximum frequency and the other is at its minimum frequency. This definition yields the following equation for difference frequency ($f_{\it diff}$):

$$f_{\it diff} = \text{Nominal Oscillator Frequency}/1\times10^6 * 2 * PPM \text{ stability} \quad \text{EQ. 1}$$

The oscillator frequency chosen for this example has a nominal operating point of 20 MHz with a +/−100 PPM stability. Using Equation 1 defined above, the maximum difference frequency between the two image acquisition systems is:

$$f_{\it diff} = 20 \text{ MHz}/1\times10^6 * 100 * 2 = 4,000 \text{ Hz}$$

Once the difference frequency is found the rate at which the two-image acquisition systems clocks slip in relationship to each other must be found. The slip count is found by determining the number of oscillator cycles in the difference frequency, which can be expressed with the following equation:

$$\text{Slip Count} = \text{Nominal Oscillator Frequency}/f_{\it diff} \quad \text{EQ. 2}$$

Using Equation 2, the slip count is:

$$\text{Slip Count} = 20 \text{ MHz}/4,000 \text{ Hz} = 5,000$$

The slip count tells us that for every 5,000 clock cycles there will be a cycle of slippage between the two image acquisition systems. This means that if the two valid lines start at about the same time, after 5,000 clocks one IAS will be ahead one clock cycle and its FIFO will accumulate an extra pixel of data.

To keep the two valid lines 85 and 86 aligned, one of the IAS must adjust itself to compensate for the extra cycle due to the slippage. This is done by designating one of the IAS as the master (reference) and one as the slave (secondary). The master IAS's output signal valid line will be designated as the reference valid line and the slave IAS's output signal valid line will be designated as the secondary valid line. The slave IAS will monitor the valid line signal from the master IAS. When the slave IAS detects a slip, it will then add or subtract a cycle (idle pixel) to adjust itself for the next valid line. The added or subtracted cycle is added or subtracted from the interline gap. The IAS control logic could be designed such that a small slippage from the ideal alignment would be acceptable. Only when the slippage exceeded some threshold would the slave IAS adjust itself. The tolerance of acceptable slippage and how often the slave IAS is updated would be dependent on the system.

Once the slave IAS has adjusted itself to within the tolerance of acceptable slippage, the slave IAS will continuously adjust its valid line signal to stay within the predefined threshold. The slave IAS will also define a lock threshold, which is slightly larger than the predefined adjustment threshold. If the skew between the master and slave valid line remains inside of the lock threshold, a lock signal 63 will be asserted to indicate that the IAS has not exceeded the lock threshold.

The invention has been described in detail with particular reference to certain preferred embodiments thereof, but it will be understood that variations and modifications can be effected within the scope of the invention.

PARTS LIST 10 image synchronization system
21 reference valid line
22 secondary valid line
23 reference valid line (aligned)
24 secondary valid line (aligned)
60 counter
61 data storage one
62 data storage two
63 lock signal
64 count value
65 data merge logic
70 front image
71 rear image
72 composite image
73 complex composite image
81 IAS one
82 IAS two
83 IAS clock one
84 IAS data in one
85 IAS valid line one
86 IAS valid line two
87 IAS clock two
88 IAS data in two
90 merge controller clock
93 single composite output stream
95 data merge controller
100 front IAS raster
101 rear IAS raster
102 composite IAS raster

What is claimed is:

1. A method for continuous synchronization of a plurality of independently clocked asynchronous data sources comprising:
 a) acquiring data units from a plurality of data sources wherein m is a total number of data sources;
 b) designating one of said data sources as a master data source;
 c) designating all other data sources except said master data source as slave data sources;
 d) set n=1 wherein n is one of said slave data source;
  d1) set p=1 wherein p is a secondary valid line for said slave data sources;
 e) compare a secondary valid line p for n slave data source to a reference valid line r for said master data source;
  e1) if secondary valid line p for n slave data source is synchronized to within a predetermined threshold of said reference valid line r go to step f);
  e2) if secondary valid line p for n slave data source lags said reference valid line r subtract at least one idle pixel from an interline gap in said secondary valid line and go to step e4);
  e3) if secondary valid line p for n slave data source leads said reference valid line r add at least one idle pixel to an interline gap in said secondary valid line and go to step e4);
  e4) set p=p+1 and go to step e);
 f) compare n to m;
  f1) if n is less than m, set n=n+1, go to step e);
  f2) if n is equals m−1, go to step g); and
 g) assert a lock signal.

2. The method as in claim 1 comprising:
 merge said master data source and said slave data sources.

3. A method for continuous synchronization of a plurality of independently clocked asynchronous data sources comprising the steps of:
 a) acquiring data units from a plurality of data sources;
 b) designating one of said data sources as a master data source;
 c) designating all other data sources except said master data source as slave data sources;
 d) comparing a secondary valid line for each of said slave data sources to a reference valid line for said master data source;
 e) subtracting at least one idle pixel from an interline gap in said secondary valid line for each of said secondary valid lines which lags said reference valid line;
 f) adding at least one idle pixel to an interline gap in said secondary valid line for each secondary valid line which leads said reference valid line;
 g) when each of said secondary valid lines has been synchronized to within a predetermined threshold of said reference valid line merge said master data source and said slave data sources;
 h) determining a total number of received data units from each source;
 i) comparing said totals to a set of thresholds;
 j) transferring said acquired data units to a composite output when said totals meet a criteria established by said thresholds; and
 k) repeating steps h-j until all data units have been acquired from said data sources.

4. An apparatus for continuous synchronization of a pair of independently clocked asynchronous data streams consisting of raster data from independent imaging acquisition systems comprising:
 a) a means for acquiring individual rasters from a first stream of data;
 b) a means for counting a first total number of received rasters;
 c) a means for comparing said first total to a first threshold;
 d) a means for acquiring individual rasters from a second stream of data; and
 e) a means for transferring said first acquired data stream and said second acquired data stream to a composite output when said first total is greater than said first threshold and without taking into consideration the total number of rasters acquired from the second stream of data.

5. The apparatus according to claim 4 wherein data acquisition means for said data units is a first-in, first-out (FIFO) buffer.

6. The apparatus according to claim 4 wherein said threshold comparison means compares a number of data units received by said data source to a predetermined maximum number of data units.

7. The apparatus according to claim 4 wherein said composite output is further defined to be the interleaving of the data received by the data sources.

8. The apparatus according to claim 4 wherein said means for transferring said input data streams to a composite output stream is clocked at a constant rate.

9. The apparatus according to claim 4 wherein said data units to be interleaved comprise pixel data.

10. The apparatus according to claim 4 wherein said data units to be interleaved comprise document data.

11. An apparatus for continuous synchronization of a pair of independently clocked asynchronous data streams consisting of raster data from independent imaging acquisition systems comprising:
   a) a first image acquisition source for acquiring individual rasters from a first stream of data;
   b) a data merge logic counter for counting a first total number of received rasters;
   c) a first comparator for comparing said first total to a first threshold;
   d) a second image acquisition source for acquiring individual rasters from a second stream of data; and
   e) a data merge controller for transferring said first acquired data stream and said second acquired data stream to a composite output when said first total is greater than said first threshold and without taking into consideration the total number of rasters acquired from the second stream of data.

12. A method for continuous synchronization of a plurality of independently clocked asynchronous data sources comprising:
   a) acquiring data units from a first and second data source;
   b) designating of said first data sources as a master data source;
   c) designating said second source as slave data source;
   d) set p=1 wherein p is valid line;
   e) compare a secondary valid line p for said slave data source to a reference valid line p for said master data source;
      e1) if said secondary valid line p is synchronized to within a predetermined threshold of said reference valid line p go to step f);
      e2) if said secondary valid line p lags said reference valid line p subtract at least one idle pixel from an interline gap in said secondary valid line and go to step e4);
      e3) if said secondary valid line p leads said reference valid line p add at least one idle pixel to an interline gap in said secondary valid line and go to step e4);
      e4) set p=p+1 and go to step e); and
   f) assert a lock signal.

13. The method as in claim 12 comprising:
   merge said master data source and said slave data source.

* * * * *